(12) United States Patent
Loch et al.

(10) Patent No.: US 7,641,399 B2
(45) Date of Patent: Jan. 5, 2010

(54) METHOD AND APPARATUS FOR MULTI-DIRECTIONAL FIBER OPTIC CONNECTION

(75) Inventors: Vern Loch, Prior Lake, MN (US); Craig Bentz, Bloomington, MN (US); Joseph Coffey, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/637,488

(22) Filed: Dec. 12, 2006

(65) Prior Publication Data

US 2007/0286558 A1 Dec. 13, 2007

Related U.S. Application Data

(63) Continuation of application No. 10/996,596, filed on Nov. 23, 2004, now Pat. No. 7,153,040, which is a continuation of application No. 10/651,565, filed on Aug. 29, 2003, now Pat. No. 6,821,031, which is a continuation of application No. 09/871,836, filed on Jun. 1, 2001, now Pat. No. 6,637,949.

(51) Int. Cl.
 G02B 6/36 (2006.01)
(52) U.S. Cl. .................................. 385/92; 385/53
(58) Field of Classification Search ............... None
 See application file for complete search history.

(56) References Cited

U.S. PATENT DOCUMENTS

| | | | |
|---|---|---|---|
| 4,303,301 A * | 12/1981 | Teichert et al. ............. 385/75 |
| 5,095,517 A | 3/1992 | Monguzzi et al. | |
| 5,276,750 A | 1/1994 | Manning | |
| 5,285,511 A * | 2/1994 | Akkapeddi et al. ........... 385/89 |
| 5,347,605 A * | 9/1994 | Isaksson .................... 385/92 |
| 5,802,230 A | 9/1998 | Kuribayashi et al. | |
| 5,980,290 A | 11/1999 | Meynier et al. | |
| 6,085,003 A * | 7/2000 | Knight ..................... 385/59 |
| 6,439,778 B1 * | 8/2002 | Cairns ..................... 385/60 |
| 6,554,484 B2 | 4/2003 | Lampert et al. | |
| 6,583,415 B2 * | 6/2003 | Stevens ................... 250/330 |
| 6,637,949 B2 | 10/2003 | Loch et al. | |
| 6,773,170 B1 * | 8/2004 | Georgiev et al. ............ 385/90 |
| 6,821,031 B2 | 11/2004 | Loch et al. | |
| 2001/0043775 A1 | 11/2001 | Shirakawa et al. | |
| 2002/0197017 A1 | 12/2002 | Petrillo | |

OTHER PUBLICATIONS

*DV6000 Universal Digital Transmission System*, ADC Video Systems, Jun. 1997.

(Continued)

*Primary Examiner*—Tina M Wong
(74) *Attorney, Agent, or Firm*—Merchant & Gould P.C.

(57) ABSTRACT

A method and apparatus are disclosed that permit multi-directional fiber optic connections to a device. The multi-directional aspect of the fiber optic connections permit the connections to be aligned closely with the direction of travel of the fiber optic cables that interface with the device. Closely aligning the fiber optic connections on the device with the fiber optic cables' direction of travel maximizes the bend radius of the fiber optic cable near the point of connection or eliminates the bend altogether and reduces the likelihood of a broken fiber or signal attenuation.

19 Claims, 10 Drawing Sheets

OTHER PUBLICATIONS

*DV6000 Dense Wavelength Division Multiplexing (DWDM) with DV6000*, ADCTelecommunications, Jun. 1997, pp. 1-3 with Ordering Information.

*FL2000 System—Fiber Optic Componets*, ADCTelecommunications, Nov. 1996, pp. 37-43.

*Fiber Panel Products—Wall Mount Accessories*, ADCTelecommunications, Jul. 1996, pp. 69-70, 73.

*Next Generation Frams—Sliding Adapter Packs*, ADCTelecommunications, Oct. 1998, p. 11.

*Value Added Module System*, ADCTelecommunications, Jun. 1998, pp. 64, 68.

*Optical Test Access Unit (OTAU) IxN Optical Switch*, ADCTelecommunications, Mar. 1998, pp. 1-3 with Ordering Information.

*Enterprise 5000E Multimedia Outlets*, ADCTelecommunications, Oct. 1998, pp. 1-10 with Ordering Information.

* cited by examiner

METHOD AND APPARATUS FOR MULTI-DIRECTIONAL FIBER OPTIC CONNECTION

CROSS-REFERENCE TO RELATED APPLICATIONS

This application is a continuation of U.S. patent application Ser. No. 10/996,596, filed on Nov. 23, 2004, now U.S. Pat. No. 7,153,040 which is a continuation of U.S. patent application Ser. No. 10/651,565, filed on Aug. 29, 2003, now U.S. Pat. No. 6,821,031, which is a continuation of U.S. patent application Ser. No. 09/871,836, filed on Jun. 1, 2001, now U.S. Pat. No. 6,637,949, which applications are incorporated herein by reference.

TECHNICAL FIELD

The present invention relates to fiber optics used for signal transfer. More particularly, the present invention is based on multi-directional fiber optic connections for devices with fiber optic inputs and/or outputs.

BACKGROUND

Fiber optic cables are useful for signal transfer. Light pulses representing data travel through the cables over very long distances and with great immunity to noise and other interference. However, fiber optic cables are more fragile than cables having electrical conductors. The fibers in the cable can be broken if the cable is bent beyond a certain amount. Once fibers are broken, signal transmission that is dependent upon those fibers terminates. Also, signal transfer in optical fibers is more susceptible to attenuation caused by bends in the fiber than is signal transfer through wires.

Typically, broken fibers and attenuation are not a problem in the median regions of the fiber optic cables. However, fiber at the ends of the cables can be troublesome because the cable must often bend where the connector attaches to a device. This is especially true when in confined spaces, such as when the device is mounted in a wall and the fiber connections to the device are made within the wall.

Ordinarily in walls, the fiber optic cable is routed parallel to the plane of the wall and within a gap separating panes of the wall. The fiber connections on the device are oriented perpendicular to the plane of the wall. Therefore, the cable must bend to account for the right angle between the direction of the fiber connector and the direction the cable is routed. If this bend forms a radius less than the minimum bend radius for the cable, a fiber break can result or the signal may become too attenuated for proper communication. For relatively narrowly gapped walls, a fiber break or attenuation is more likely to occur because the cable must form a bend with a relatively smaller radius.

SUMMARY

The present invention addresses these and other problems by providing multi-directional fiber connections. The fiber connections on the device are movable in relation to the housing so that the fiber optic cables can interface with the fiber connections on the device while forming a greater bend radius than would result had fixed fiber connections been used. The greater bend radius reduces the likelihood of broken fibers or signal attenuation.

The present invention is embodied in a device for coupling a first signal line to a fiber optic cable. The device includes a main housing and also includes at least one connector receptacle that is movably supported by the main housing. The connector receptacle is for interfacing with the fiber optic cable.

The present invention is also embodied in a method for providing a device that couples a first signal line to a fiber optic cable. The method involves providing a main housing having a connector receptacle mount and providing a connector receptacle that is configured to movably attach to the connector receptacle mount and receive the fiber optic cable. The method also involves movably affixing the connector receptacle to the main housing by attaching the connector receptacle to the connector receptacle mount.

Another device embodying the present invention includes a main housing. The device also includes means for movably supporting a connector receptacle within the main housing. The connector receptacle interfaces with a fiber optic cable and transfers the signal being carried by the fiber optic cable.

DETAILED DESCRIPTION

Figure 1:
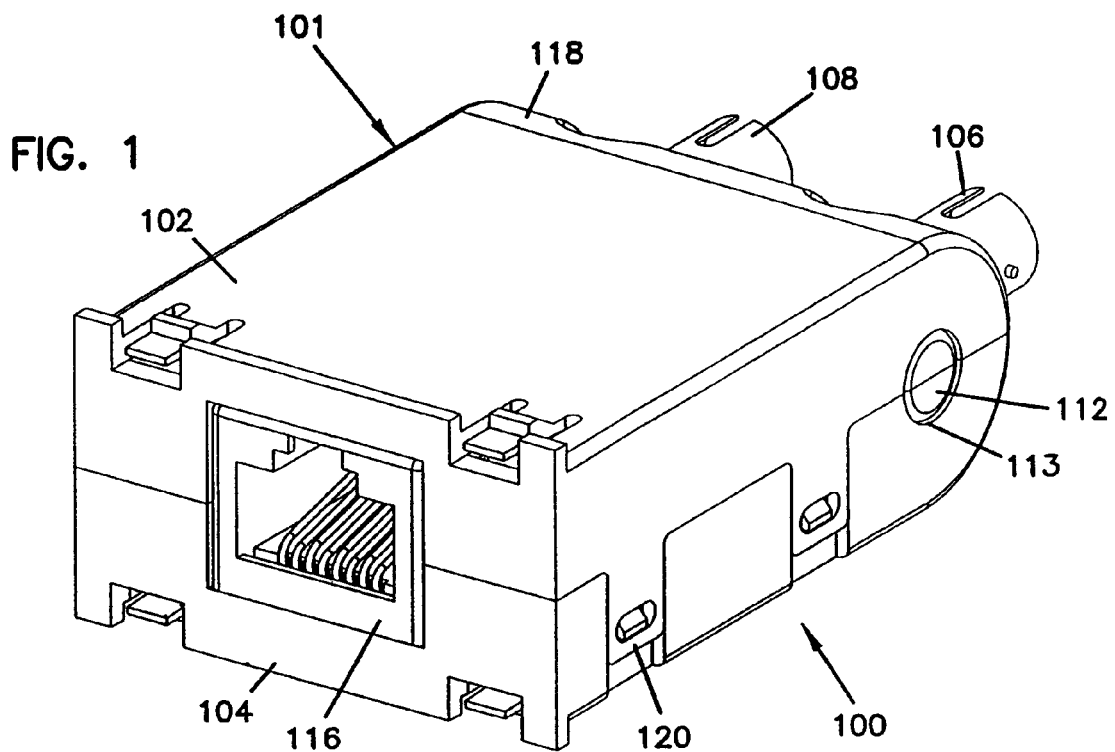
FIG. 1 is a front perspective view of one device embodying the present invention and having a jack for transferring electrical signals and having two fiber optic connector receptacles for transferring light pulses.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto.

Figure 13:
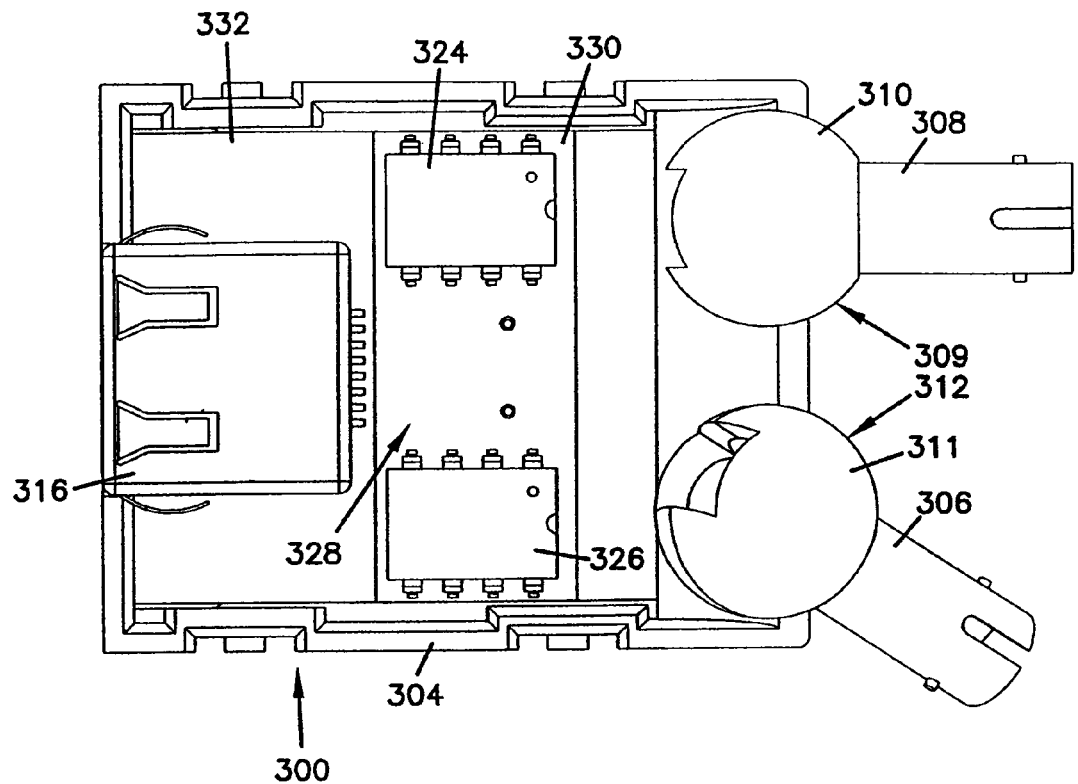
FIG. 13 is a top view of another embodiment of the present invention having orbital fiber connections.
Figure 14:
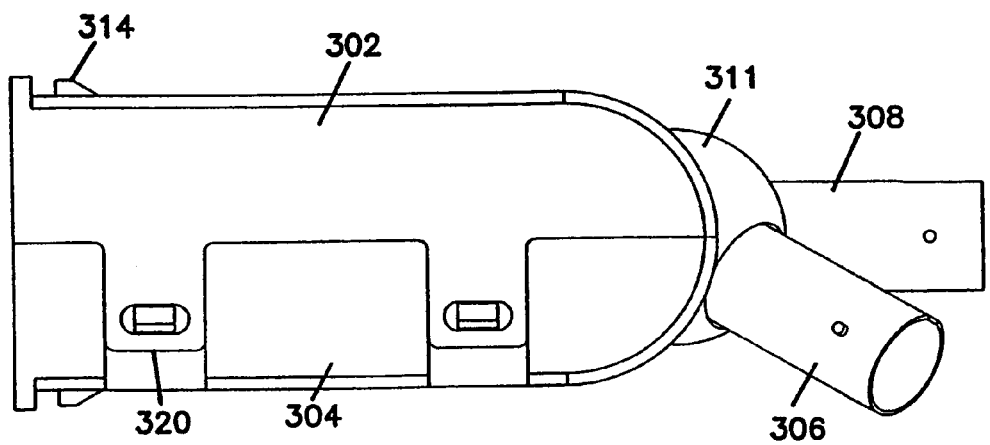
FIG. 14 is a side view of the embodiment with orbital fiber connections.
Figure 15:
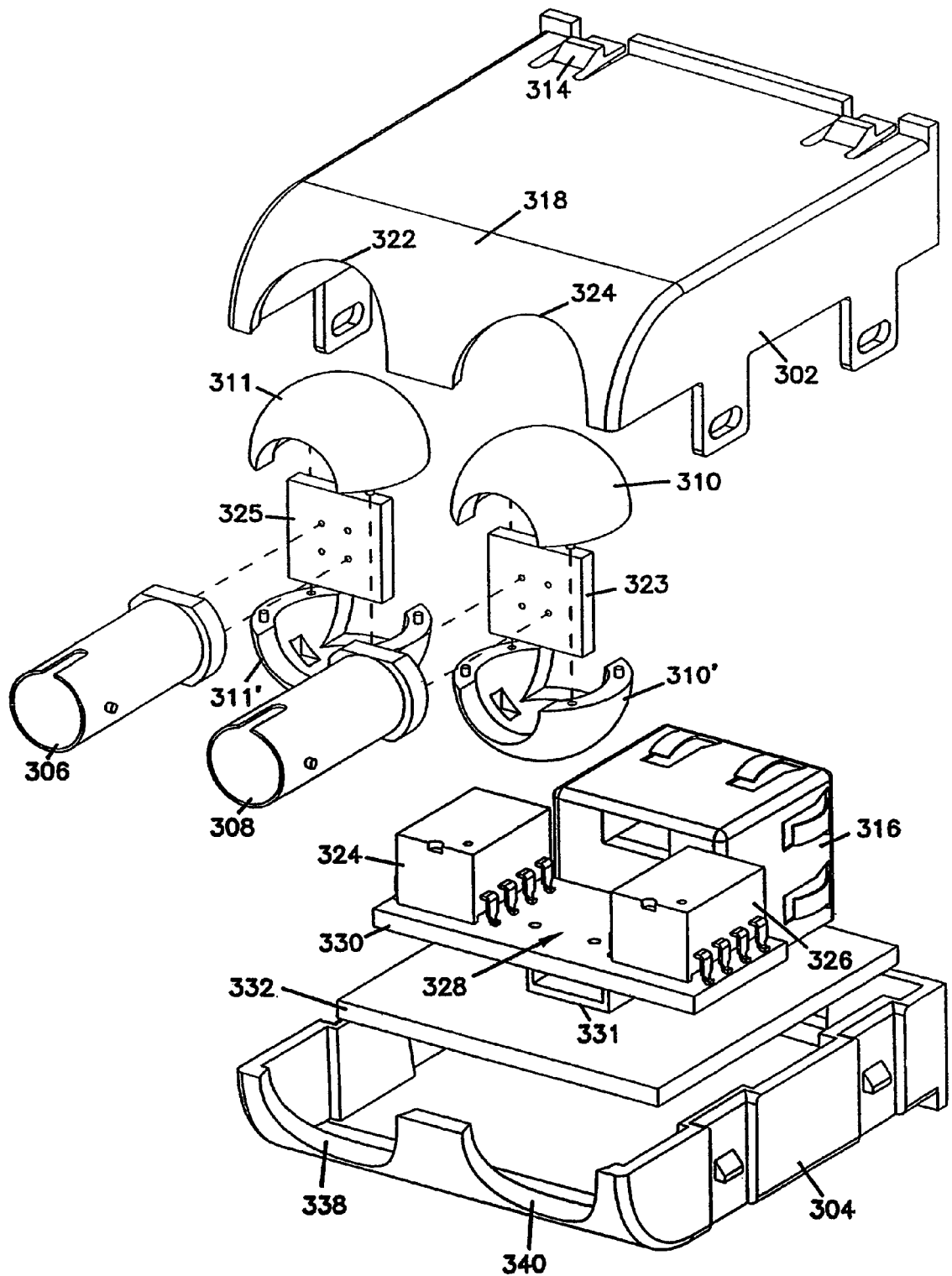
FIG. 15 is an exploded perspective view of the embodiment with orbital connections.

The present invention provides multi-directional connections for fiber optic cable to devices with fiber optic inputs and/or outputs referred to as connector receptacles. The multi-directional connections can take various forms including pivotal connections, as shown in FIGS. 1-12, that limit the connection's movement to rotation about one axis. Other multi-directional connections are possible as well such as orbital type connections as shown in FIGS. 13-15 allowing movement of the connections in a virtually unlimited number of axes.

Devices utilizing the present invention allow the connections to be oriented in a direction that more closely aligns the connector receptacle with the direction of travel of the fiber optic cable. This alignment allows the fiber optic cable to interface with the device with a relatively large bend radius or no bend at all. Maximizing the bend radius reduces the likelihood that fiber breaks will occur or that the light pulse signal will be too greatly attenuated for proper signal transfer.

Figure 2:
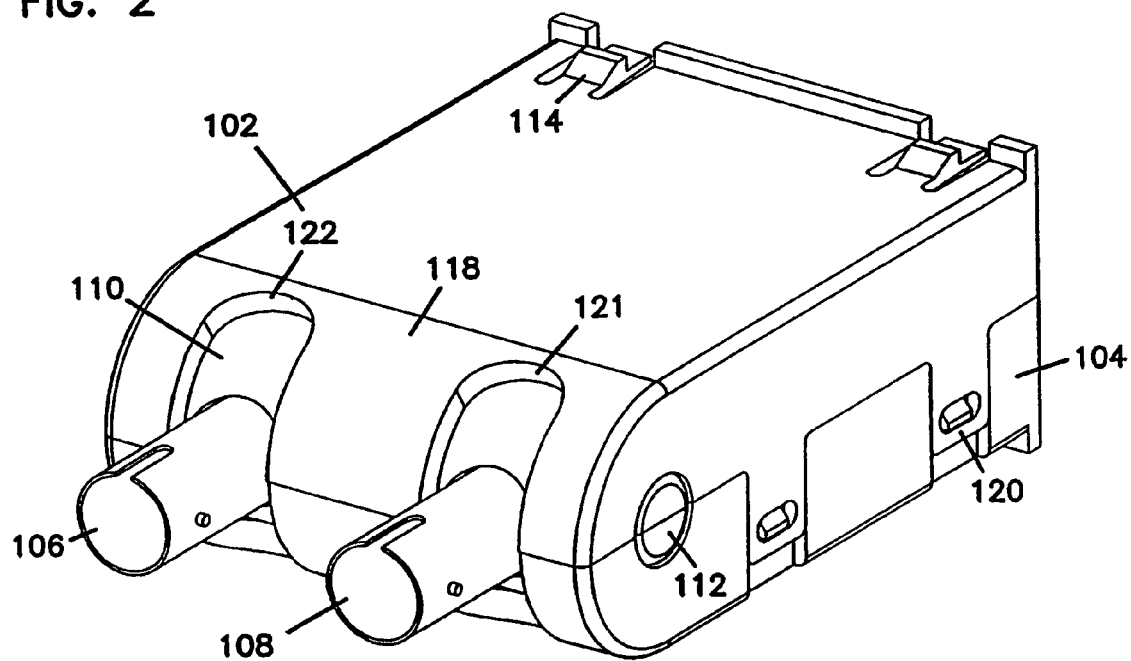
FIG. 2 is a rear perspective view of the device further illustrating the connector receptacles.
Figure 5:
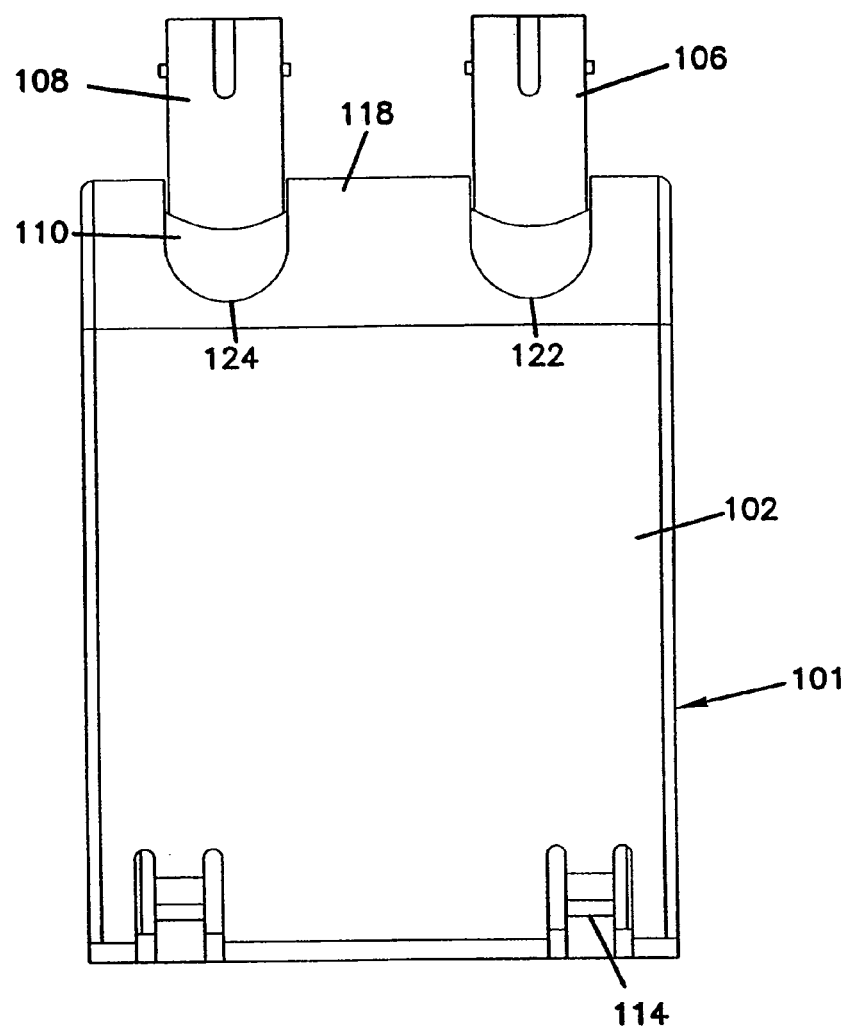
FIG. 5 is a top view of the device.
Figure 6:
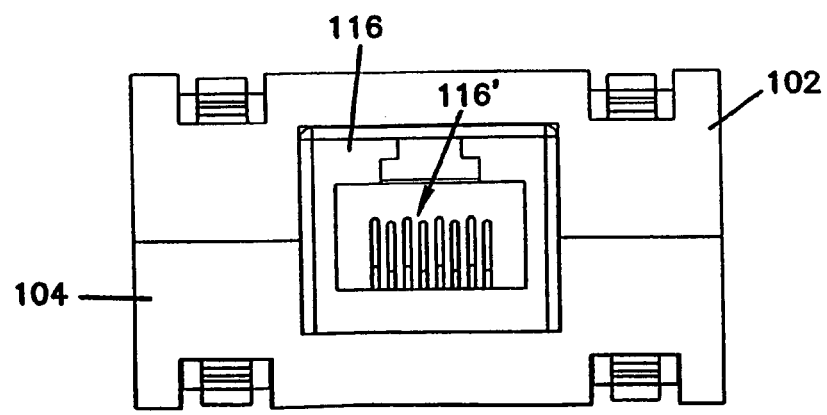
FIG. 6 is a front view of the device.
Figure 8:
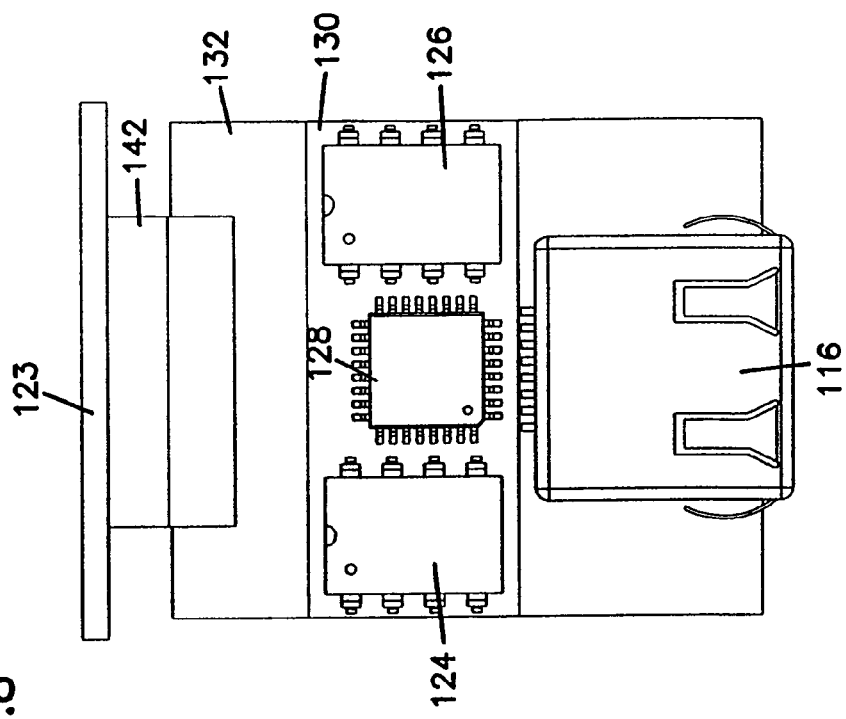
FIG. 8 is a top view of the electrical components of the device.
Figure 7:
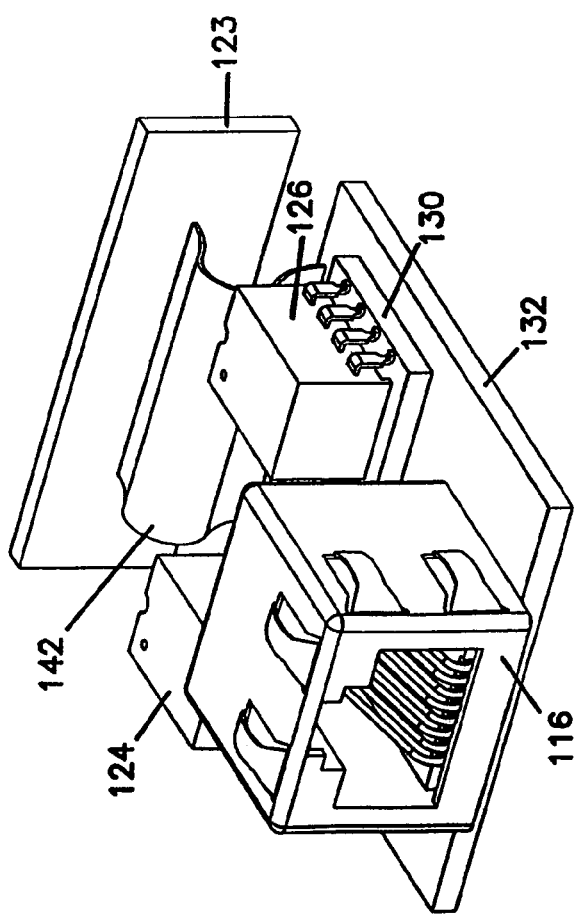
FIG. 7 is a perspective view of the electrical components of the device.
Figure 10:
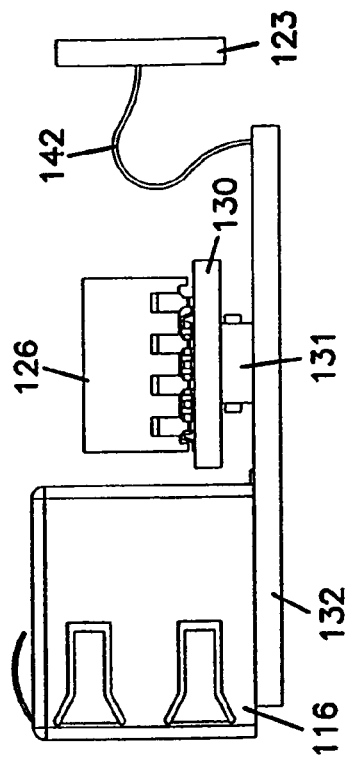
FIG. 10 is a right side view of the components of the device.
Figure 9:
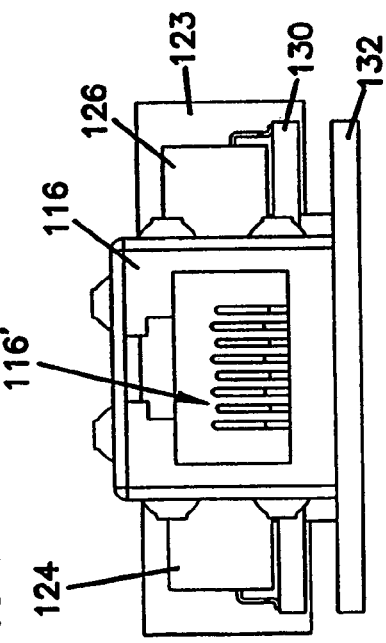
FIG. 9 is a front view of the components of the device.

FIGS. 1 and 2 are front and rear perspective views and FIGS. 5 and 6 are top and front views of one embodiment of the present invention. The device 100 in this embodiment is a media converter that receives a signal in one media and outputs the signal in another media. As shown, the media converter 100 is setup to establish two-way communication using two fiber optic cables, one for transmitting and one for receiving, and a single RJ-45 jack supporting bi-directional communication. The media converter 100 receives light signals through one fiber optic receptacle 106 that interfaces with a fiber optic cable (not shown) that carries the received light signal. The media converter 100 outputs an electrical signal corresponding to the light signal through an RJ-45 jack 116 which has a plurality of electrically conductive pins 116'.

In the embodiment shown, the media converter also receives electrical signals through the RJ-45 jack 116 and converts the electrical signal to light signals that are output through connector receptacle 108. Another fiber optic cable (not shown) interfaces with connector receptacle 108 and carries the light signal being transmitted by the media converter 100. Other devices in addition to media converters may utilize the present invention, and the number and types of connector receptacles and jacks employed by the device may vary from those shown.

The device 100 in this embodiment has a main housing 101 consisting of two joined hulls 102 and 104. The hulls 102, 104 are held together by assembly connections 120 formed by tabs and nubs. The hulls 102, 104 provide mounting catches 114 that hold the device in place when mounted in a wall frame. The hulls 102, 104 form a semi-cylindrical end 118 where the connector receptacles 106 and 108 are located. The connector receptacles 106, 108 of this embodiment are unified by a second housing 110 that is cylindrical. The second housing 110 fits within the semi-cylindrical end of the main housing 101 formed by hulls 102 and 104.

The second housing 110 provides end shafts 112 that protrude through holes 113 in the semi-cylindrical end of the device 100. The end shafts 112 secure the second housing 110 within the main housing 101 but allow the second housing 110 to rotate about the axis formed by the end shafts 112. The second housing 110 supports the connector receptacles 106 and 108. The semi-cylindrical end 118 of the main housing 101 is provided with slots 122 and 124 from which the connector receptacles 106 and 108 protrude. Because the second housing 110 is able to rotate and the slots are provided in the main housing, the connector receptacles 106 and 108 are able to pivot about the axis formed by the endshafts 112. Some friction results from the endshafts 112 located within the holes 113, and this friction holds the receptacles 106 and 108 in a given position when they are not otherwise being pivoted.

Figure 3:
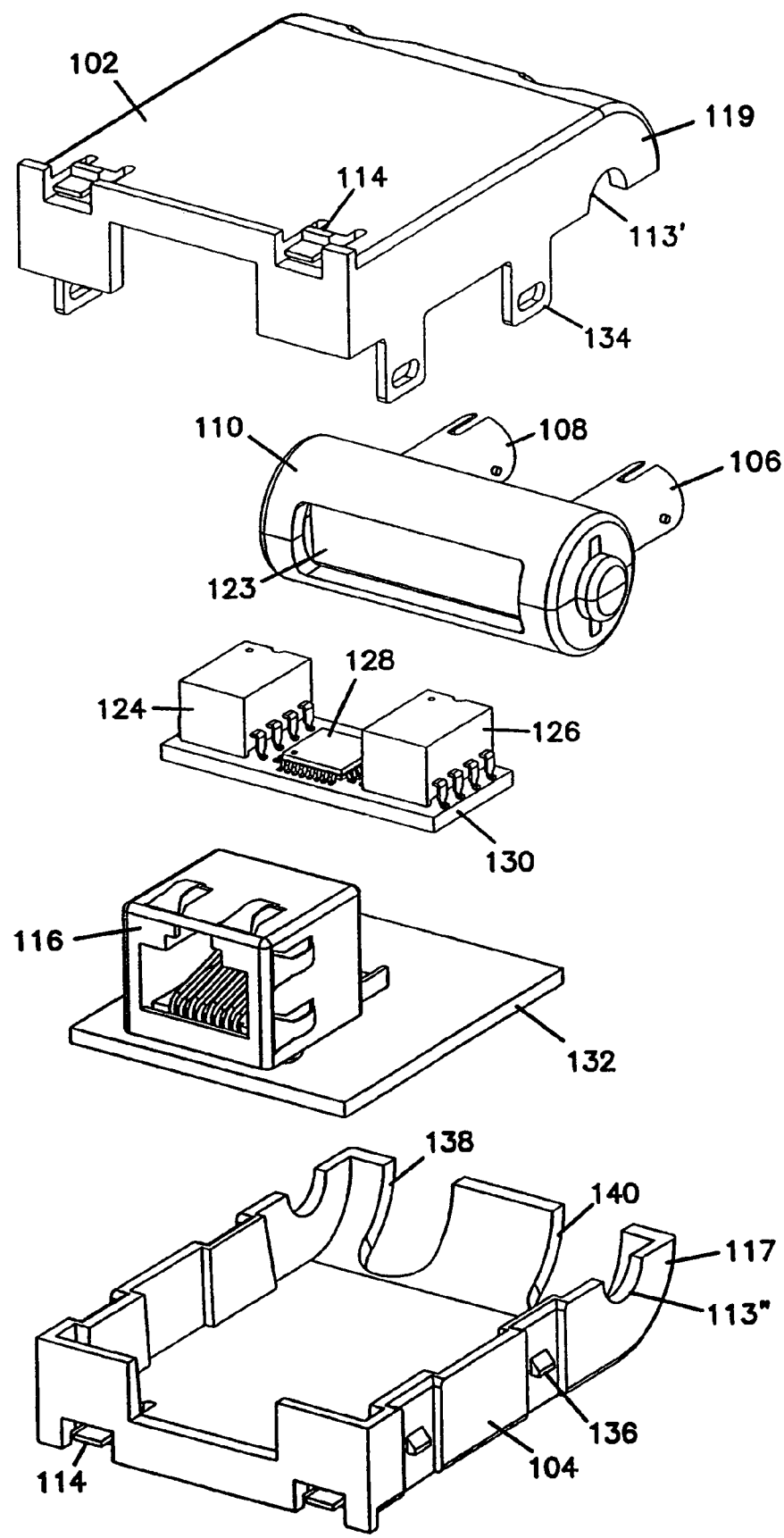
FIG. 3 is an exploded perspective view of the device.

An exploded view of the embodiment shown in FIG. 1 is shown in FIG. 3. The top hull 102 of the device 100 has mounting tabs 114 that allow the device to be inserted into a wall mount and fixed in place. The top hull 102 also has housing assembly tabs 134 for securing the top hull 102 to the bottom hull 104. The top hull 102 also is provided with a quarter cylindrical end 119 with a semi-circular hole 113' that supports the endshafts 112 of the second housing 110 along with a semi-circular hole 113" in the bottom hull 104.

The bottom hull 104 similarly has mounting tabs 114 for mounting the device to a wall mount. The bottom hull 104 also provides nubs 136 that provide a catch for the assembly tabs 134 located on the top hull 102. The top hull 102 and bottom hull 104 are secured together by the assembly tabs 134 and nubs 136. The media converter components of the exemplary embodiment are housed within the main housing 101 created by the attachment of the top hull 102 and the bottom hull 104. The bottom hull 104 also provides a quarter cylindrical end 117 that forms a semi-cylindrical end 118 when mated with the quarter cylindrical end 119 of the top hull 102. Slots 138 and 140 are also provided in the bottom hull 104 and are aligned with slots 122, 124 of the top hull 102 to permit connector receptacle movement relative to the main housing 101 formed by the joined top and bottom hulls 102 and 104.

The media converter components within the main housing 101 include a circuit board 132 supporting jack 116. A circuit board 130 is also included and supports transformers 124, 126 and an integrated circuit chip 128. These components are discussed in more detail below with reference to FIGS. 7-10.

Figure 4:
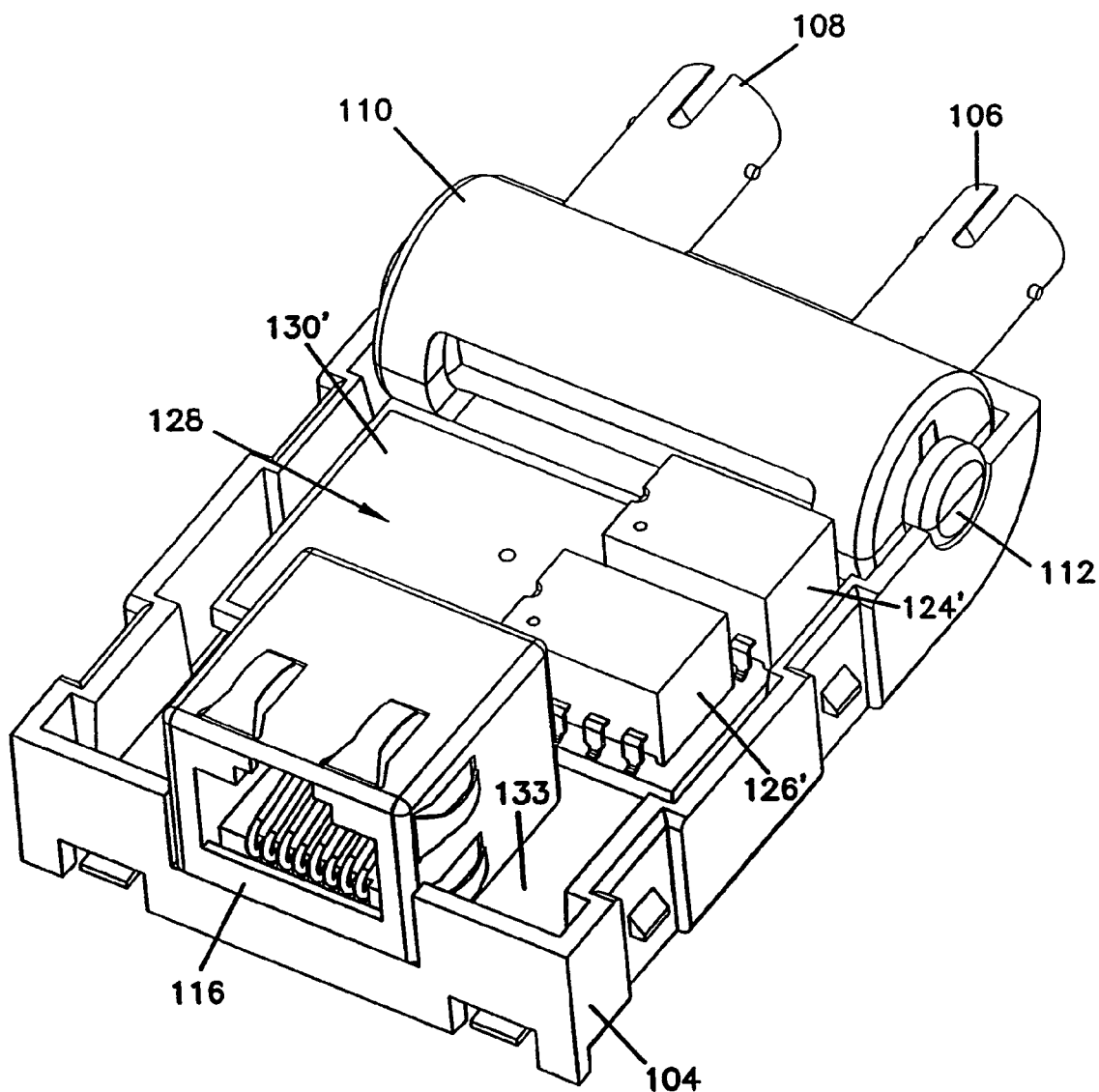
FIG. 4 is a top view of an alternative embodiment of the device with the top hull removed.

FIG. 4 shows a perspective view of an embodiment utilizing a transformer configuration different than that of the embodiment of FIGS. 1-3. The top hull 102 has been removed so that the fit of the components within the bottom hull 104 can be seen. In this embodiment, the transformers 124' and 126' are mounted side-by-side with their longitudinal direction extending side-to-side rather than front-to-back. The transformers 124' and 126' are mounted to a circuit board 130' having a space 128' for mounting the integrated circuit chip 128. The circuit board 130' mounts to a circuit board 133 supporting the jack 116. The circuit board 133 is supported by the bottom hull 104 that also supports the second housing 110 with receptacles 106, 108.

The media converter components, partially shown in FIGS. 7-10, are well known in the art and include the RJ-45 jack 116 mounted to a circuit board 132. Also included in the standard media converter components are the integrated circuit 128 and transformers 124 and 126. As shown, the integrated circuit 128 and transformers 124 and 126 are mounted on circuit board 130 that is connected to circuit board 132 by header connector 131. The circuit board 132 permits transfer of electrical signals from the RJ-45 jack 116 to circuit board 130 and from circuit board 130 to a flex circuit 142 that electrically communicates with receptacle circuit board 123. Receptacle circuit board 123 supports converter circuitry (not shown) that communicates with the integrated circuit 128 through the flex circuit 142. The converter circuitry (not shown) and receptacle board 123 are mounted within the second housing 110.

The converter circuitry (not shown) supported by the receptacle circuit board 123 and housed by the second housing 110 has a photodetector fixed relative to the connector receptacle 106 for receiving light that has transferred from the fiber optic cable that is connected to the connector receptacle 106. The photodetector converts the light pulses into electrical signals that are passed to the integrated circuit 128 through the flex circuit 142. The integrated circuit 128 takes the electrical data signals from the photodetector and conditions the signal, as is well known in the art, for transmission through electrical wires that contact the pins 116' of the RJ-45 jack 116.

The converter circuitry supported by the receptacle circuit board 123 and housed by the second housing 110 also has a light emitter fixed relative to the connector receptacle 108. The emitter is for applying light pulses to the fiber optic cable interfaced with the connector receptacle 108. The emitter converts electrical signals that were passed through the RJ-45 jack 116 and conditioned by the integrated circuit 128 into the light pulse signals that can be transmitted by the fiber optic cable. The emitter receives the electrical signal through the flex circuit 142.

As is known in the art, the flex circuit 142 is a flexible piece of material that has individual, isolated conductors passing through it. The flex circuit 142 allows the emitter and the photodetector to remain in electrical communication with the circuit board 130 even though the emitter and photodetector move in relation to the circuit board 130 when the connector receptacles 106 and 108 move in relation to the main housing 101. In this embodiment, the flex circuit 142 allows the bend in the signal transfer media to occur in wires of the flex circuit 142 rather than in the fiber. Wires generally are not damaged by a relatively small bend radius, and electrical signal attenuation does not occur in wire bends. Therefore, signal transfer is unaffected by the movement of the connector receptacles 106 and 108 in relation to the main housing 101.

Although the embodiment shown illustrates a main housing 101 supporting the connector receptacles 106, 108 such that they may pivot, the connector receptacles 106, 108 may be movably supported in other ways. For example, the connector receptacles may be orbitally supported by the main housing 101 as shown in FIGS. 13-15 and discussed below. Furthermore, the connector receptacles may vary in number for a given device and may be independently movable with respect to one another. For instance, each connector receptacle may have its own independent orbital support.

Also, the connector receptacles may movably attach to the main housing directly, rather than through the secondary housing. The main housing may provide connector receptacle mounts other than a second housing. For example, the connector receptacles could mount to the main housing with pins that rotate within mounting holes provided by the main housing. Other methods for mounting the connector receptacles to the main housing without using secondary housings are possible as well.

The range of movement of the connector receptacles can be restricted if necessary. Limiting the size of the slot that the connector receptacle protrudes from is one way to provide such a restriction. An example of where a limited range of movement is desirable is where the opening in the secondary housing that allows the flex circuit to pass through can be partially exposed to the outside by the slot for the connector receptacle's protrusion. If a restriction is not imposed and the connector receptacle is moved to an extreme position, such exposure may occur. Therefore, it may be desirable to prevent the opening for the flex circuit to be exposed to prevent debris from entering the second housing and/or the main housing.

Figure 11:
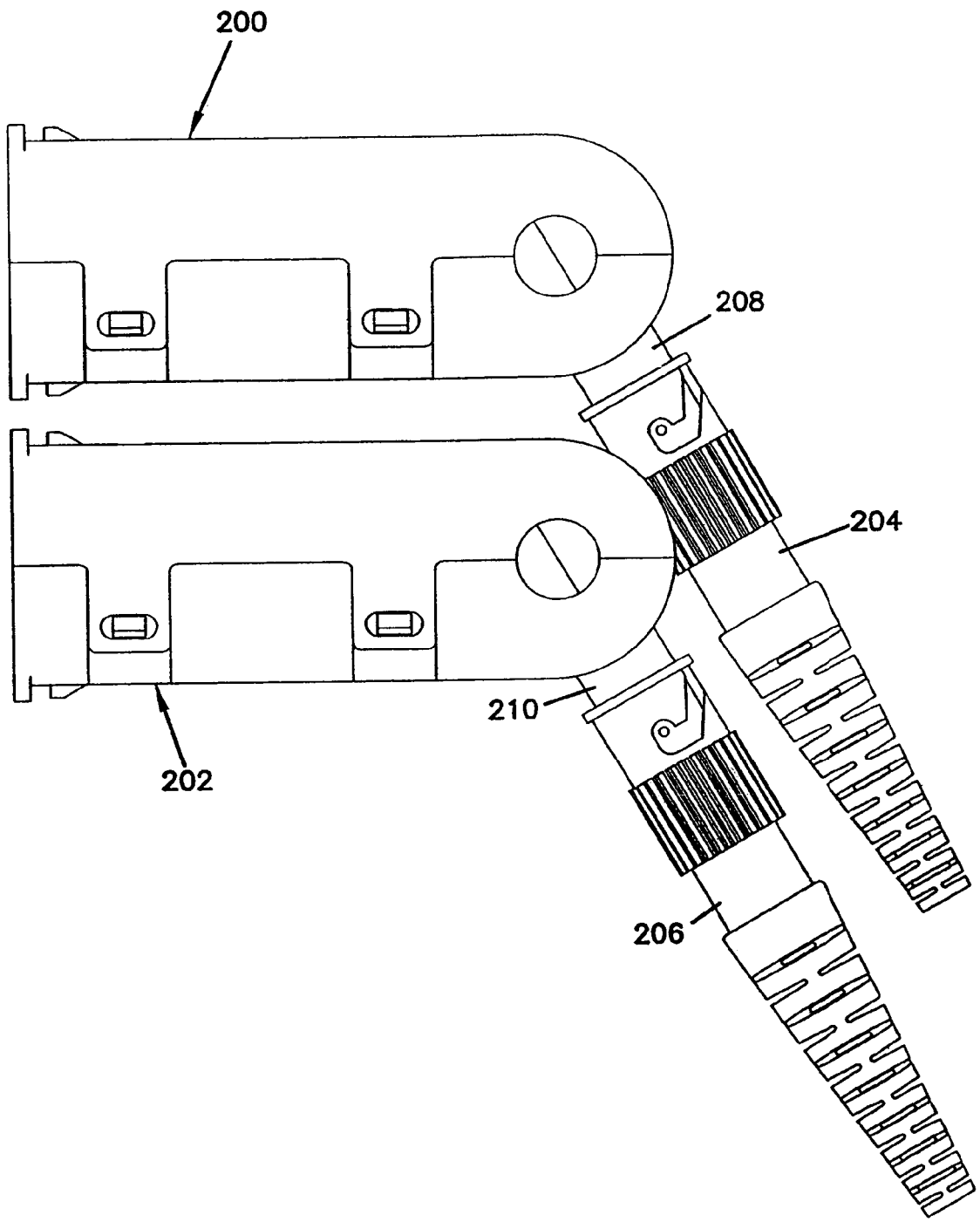
FIG. 11 is a right side view of the two devices as they would typically be situated when mounted within a wall.
Figure 12:
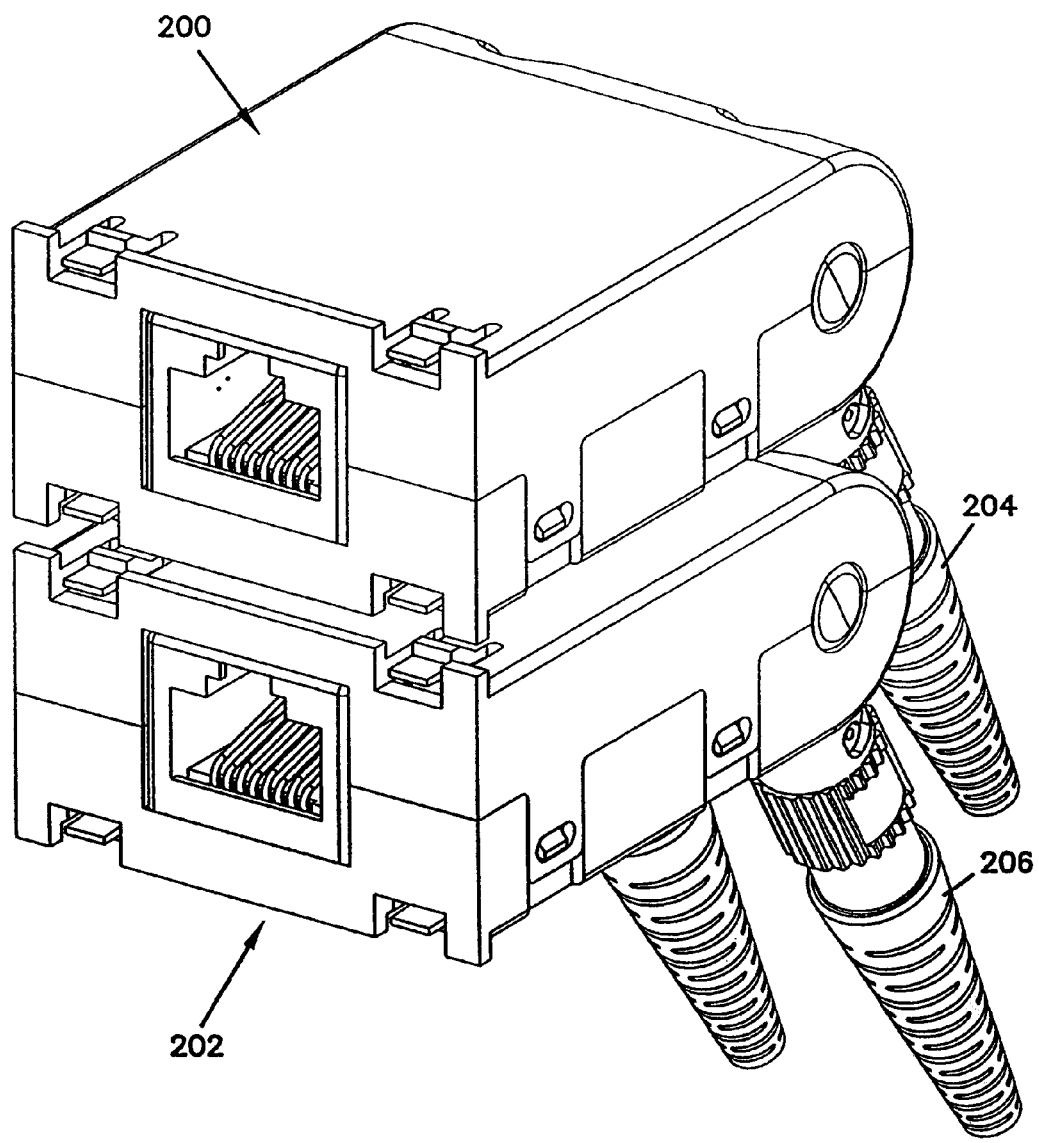
FIG. 12 is a perspective view of two exemplary devices as they would typically be situated when mounted within a wall.

FIG. 11 shows a side view and FIG. 12 shows a perspective view of two media converter units 200, 202 being positioned in a wall mount configuration. The units 200 and 202 are horizontally mounted and the ends opposite the fiber optic cable connectors 204, 206 typically mount flush with the wall's surface. Often the wall is double paned with a gap between each pane. The units 200 and 202 mount within the gap to remain out of view.

Fiber optic cables generally pass between the panes and approach the units 200 and 202 from above or below. The connector receptacles 208 and 210 can be angled toward the approach direction of the fiber optic cables 204, 206. The fiber optic cables 204 and 206 can be aligned with and inserted into the connector receptacles 208 and 210 with a minimum amount of bending. Because the connector receptacles 208 and 210 are directed toward the cable's direction of travel, the bend radius of the fiber optic cable near the cable connectors 208 and 210 is maximized or eliminated altogether.

FIGS. 13-15 show an alternative embodiment of the present invention employing orbital connections to the main housing 300 for each connector receptacle 306, 308. The orbital or ball-and-socket type connections allow the connector receptacles to move in many directions relative to the main housing, and to move independently of one another. Thus, the fiber cable providing a signal to the device may approach from one direction and the fiber cable transmitting a signal from the device may approach from another direction.

The housing 300 includes a top hull 302 and a bottom hull 304 attached to one another with assembly connections 320. The housing 300 includes mounting tabs 314 for fixing the device in place within a wall mount. The bottom hull 304 supports a circuit board 332. The circuit board 332 supports a jack 316 and a header connector 331. A circuit board 330 is mounted to the header connector 331 and supports transformers 324, 326 and an integrated circuit chip (not shown) that may be mounted in chip area 328. The circuit board 332 provides electrical connections between the jack 316 and the chip. The circuit board 332 also provides electrical connections between the chip and two flex circuits (not shown).

One flex circuit carries electrical signals between the circuit board 332 and a photoelectric circuit board 323. The photoelectric circuit board 323 is connected to the connector receptacle 308. The other flex circuit carries electrical signals between the circuit board 332 and a photoelectric circuit board 325. The photoelectric circuit board 325 is connected to the connector receptacle 306. The photoelectric circuit board 323 is mounted within an orb 309 including a top orb hull 310 and a bottom orb hull 310'. Likewise, the photoelectric circuit board 325 is mounted within an orb 312 including a top orb hull 311 and a bottom orb hull 311'.

The orb 309 is supported by the main housing 300, but the connector receptacle 308 remains movable in many directions due to the semi-circular recess 324 in the top hull 302 and the semi-circular recess 340 in the bottom hull 304 that form a circular hole of the main housing 300 that is slightly smaller in diameter than the orb 309. Likewise, the orb 312 is supported by the main housing 300, but the connector receptacle 306 remains movable in many directions due to the semi-circular recess 322 in the top hull 302 and the semi-circular recess 338 in the bottom hull 304. The circular holes of the main housing 300 are formed on a semi-cylindrical end 318.

The two orbs 309 and 312 are independently movable with respect to the housing 300. Thus, an input fiber cable (not shown) may approach the main housing 300 from one direction while the output fiber cable (not shown) may approach the main housing 300 from another direction, and each orb 309, 312 can be moved to point toward the direction from which the corresponding fiber cable approaches. For example, the input fiber cable may approach from above the housing 300 while the output cable approaches from below the housing 300. Orb 309 can be directed upward while orb 312 is directed downward. Similarly, the input cable may approach from the left while the output cable approaches from the right. Orb 309 can be directed to the left while orb 312 is directed to the right.

While the invention has been particularly shown and described with reference to preferred embodiments thereof, it will be understood by those skilled in the art that various other changes in the form and details may be made therein without departing from the spirit and scope of the invention.

We Claim:

1. A device for coupling a signal line to a fiber optic cable, the device comprising a main housing including a twisted pair electrical connection;

a connector receptacle movable in relation to the main housing;

a photodetector fixed in relation to the connector receptacle, the photodetector configured to convert light signals received in the connector receptacle into electrical signals; and circuitry for transferring the electrical signals between the fiber optic cable and signal line;

wherein the connector receptacle is pivotally supported by at least one elongated slot, the elongated slot defining an elongated shape disposed along an exterior surface of the main housing through which the connector receptacle protrudes.

2. The device of claim 1, wherein the circuitry is configured to transfer the electrical signals from the photodetector to the signal line.

3. The device of claim 1, wherein the circuitry is configured to transfer the electrical signals from the signal line to the connector receptacle.

4. The device of claim 3, wherein the circuitry includes an emitter.

5. The device of claim 1, wherein the circuitry includes a flex circuit.

6. The device of claim 1, wherein the circuitry includes an integrated circuit within the main housing.

7. The device of claim 1, wherein the circuitry includes an RJ-45 jack.

8. The device of claim 1, wherein the main housing includes a top portion and a bottom portion joined at a junction.

9. The device of claim 8, wherein the junction of the top portion and the bottom portion defines a cavity.

10. The device of claim 1, further comprising a second connector receptacle independently movable relative to the main housing and the connector receptacle.

11. The device of claim 1, wherein the main housing includes one or more mounting tabs.

12. A device for coupling a signal line to a fiber optic cable, the device comprising:

a main housing including a junction of a top portion and a bottom portion defining a cavity, the main housing including an RJ-45 jack at least partially within the cavity;

a connector receptacle movable in relation to the main housing;

a photodetector fixed in relation to the connector receptacle, the photodetector configured to convert light signals received in the connector receptacle into electrical signals; and circuitry for transferring the electrical signals from the photodetector to the signal line via the RJ-45 jack.

13. The device of claim 12, wherein the circuitry is additionally configured for transferring the electrical signals from the signal line to the fiber optic cable.

14. The device of claim 12, wherein the circuitry includes a flex circuit.

15. The device of claim 12, wherein the main housing includes one or more mounting tabs.

16. The device of claim 12, wherein the connector receptacle is orbitally supported by the main housing within the cavity defined by the top portion and the bottom portion.

17. The device of claim 12, wherein the connector receptacle is pivotally supported by at least one elongated slot, the elongated slot defining an elongated shape disposed along an exterior surface of the main housing through which the connector receptacle protrudes.

18. The device of claim 12, further comprising a second connector receptacle independently movable relative to the main housing and the connector receptacle.

19. A device for coupling a signal line to a fiber optic cable, the device comprising:

a main housing including a junction of a top portion and a bottom portion defining a cavity;

a connector receptacle movable in relation to the main housing;

a photodetector fixed in relation to the connector receptacle, the photodetector configured to convert light signals received in the connector receptacle into electrical signals; and circuitry for transferring the electrical signals between the fiber optic cable and signal line;

wherein the connector receptacle is orbitally supported by the main housing within the cavity defined by the top portion and the bottom portion.

\* \* \* \* \*